United States Patent [19]
Lee

[11] Patent Number: 5,848,843
[45] Date of Patent: Dec. 15, 1998

[54] DUAL SUPPORTING PIVOT THRUST BEARING APPARATUS

[75] Inventor: Chang-woo Lee, Suwon, Rep. of Korea

[73] Assignee: Samsung Electronics Co., Ltd., Kyungki-do, Rep. of Korea

[21] Appl. No.: 960,432

[22] Filed: Oct. 29, 1997

[30] Foreign Application Priority Data

Oct. 29, 1996 [KR] Rep. of Korea .................. 1996/49783

[51] Int. Cl.$^6$ ............................. F16C 19/00; F16C 17/08
[52] U.S. Cl. ............................................. 384/101; 384/610
[58] Field of Search .................................... 384/101, 102, 384/610, 113, 115, 114

[56] References Cited

U.S. PATENT DOCUMENTS 4,792,245 12/1988 Fuke et al. ............................... 384/610
4,865,529 9/1989 Sutton et al. ............................. 384/102

*Primary Examiner*—Lenard A. Footland
*Attorney, Agent, or Firm*—Sughrue, Mion, Zinn, Macpeak & Seas, PLLC

[57] ABSTRACT

A supporting pivot thrust bearing apparatus is provided in which a steel ball groove is formed at both ends of a rotary shaft inserted into a through hole of a sleeve, and a steel ball is fixably inserted between the steel ball groove and a thrust support. The steel ball is in contact with the steel ball groove by line contact so that lateral of the steel ball can be prevented. As a result, eccentricity between a center shaft of the steel ball and a center shaft of the rotary shaft can be prevented, thereby improving rotative stabilization of the rotary shaft.

8 Claims, 3 Drawing Sheets

DUAL SUPPORTING PIVOT THRUST BEARING APPARATUS

BACKGROUND OF THE INVENTION

1. Field of the Invention

The present invention relates to a supporting pivot thrust bearing apparatus having support at both ends, and more particularly, to a dual supporting pivot thrust bearing apparatus in which a steel ball at both ends groove is formed at both ends of a rotary shaft to have a steel ball at both ends be exactly coincident with the center of the rotary shaft so that frictional resistance between the rotary shaft and a thrust support can be reduced.

2. Description of the Related Art

Recently, with improvement of technologies in information and computer industries, there has been a demand for high accuracy and high speed driving motors, having no movement or oscillation of a rotary shaft for various machines, such as a polygon mirror driving gear of a laser printer, a spindle motor of a hard disk, a head driving motor of a VCR, and the like. Movement or oscillation of the rotary shaft in the driving motors causes performance of the machine to be deteriorated. In this respect, a driving motor capable of stably rotating at high speed has been developed together with various bearing apparatuses which enable the rotary shaft of the driving motor to rotate at high speed with high accuracy. As examples of such bearing apparatuses, there are a kinetic pressure fluid bearing apparatus and a both-end supporting pivot thrust bearing apparatus. The kinetic pressure fluid bearing apparatus is to reduce frictional resistance of the rotary shaft by flowing a predetermined fluid into a frictional boundary which lies in frictional state with the rotary shaft to form a fluid pressure and forming a fluid boundary by the fluid pressure. The both-end supporting pivot thrust bearing apparatus is to support a thrust load by a steel ball inserted into both ends of the rotary shaft.

A conventional both-end supporting pivot thrust bearing apparatus among various bearing apparatuses will be described with reference to the accompanying drawings.

FIG. 1 shows a partial sectional view illustrating a conventional both-end supporting pivot thrust bearing.

Referring to FIG. 1, the conventional both-end supporting pivot thrust bearing apparatus includes a rotary shaft 30 having a kinetic pressure generating groove 30a on its external side, a sleeve 20 for inserting the rotary shaft 30 into a through hole 25 formed therein, and a thrust support 40 for fitting a steel ball 35 in both ends of the rotary shaft 30 to support a thrust load. A reference numeral 10 denotes a lower bearing bracket. The both-end supporting pivot thrust bearing of FIG. 1 has a symmetrical structure in practical use. In FIG. 1, for convenience of description, an upper structure of the both-end supporting pivot thrust bearing is not illustrated.

In the aforementioned structure, since a diameter of the rotary shaft is smaller than the inside diameter of the sleeve, a predetermined clearance is formed between the sleeve and the rotary shaft to rotate them without contacting with each other. However, when the rotary shaft does not rotate, the rotary shaft is not disposed at the center of the sleeve. In other words, the rotary shaft is eccentric as much as L in a predetermined direction from the center of the sleeve or is in contact with the sleeve as illustrated in FIG. 1. At this time, the steel ball is fixed between the thrust support and the end portion of the rotary shaft. Thus, when the rotary shaft starts to rotate, a load support is not in the center of the steel ball in response to an eccentric distance between the rotary shaft and the steel ball. As a result, when the rotary shaft starts to rotate and stops its rotation, the rotary shaft is in contact with the sleeve. This results in a problem that rotative stabilization of the rotary shaft is reduced.

SUMMARY OF THE INVENTION

Accordingly, the present invention is directed to a both-end supporting pivot thrust bearing apparatus that substantially obviates one or more of the problems due to limitations and disadvantages of the related art.

An object of the present invention is to provide a both-end supporting pivot thrust bearing apparatus in which the center of a rotary shaft is not eccentric against the center of a steel ball even if the rotary shaft stops its rotation so that the rotary shaft can stably rotate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a both-end supporting pivot thrust bearing apparatus according to the present invention includes a pair of sleeves mounted into one end of a pair of bearing brackets, a rotary shaft inserted into through holes of the sleeves, having a second kinetic pressure generating groove on an external side which faces an internal side of the respective through hole, a pair of thrust supports mounted into the other end of a pair of the bearing brackets, a steel ball inserted between both ends of the rotary shaft and a pair of the thrust supports, and a position fixing portion formed at the both ends of the rotary shaft and in contact with the steel ball to prevent left and right motion of the steel ball.

In the preferred embodiment of the present invention, the position fixing portion includes a groove having a center shaft which is coincident with the center shaft of the rotary shaft. Desirably, the groove may have a triangular shaped section, a circular arc shaped section, or a trapezoid shaped section. One of the apexes of the triangular shaped groove is disposed on the center shaft of the rotary shaft. The steel ball is in contact with an inner sidewall of the triangular shaped groove. The circular shaped groove has a curvature larger or same as that of the steel ball.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
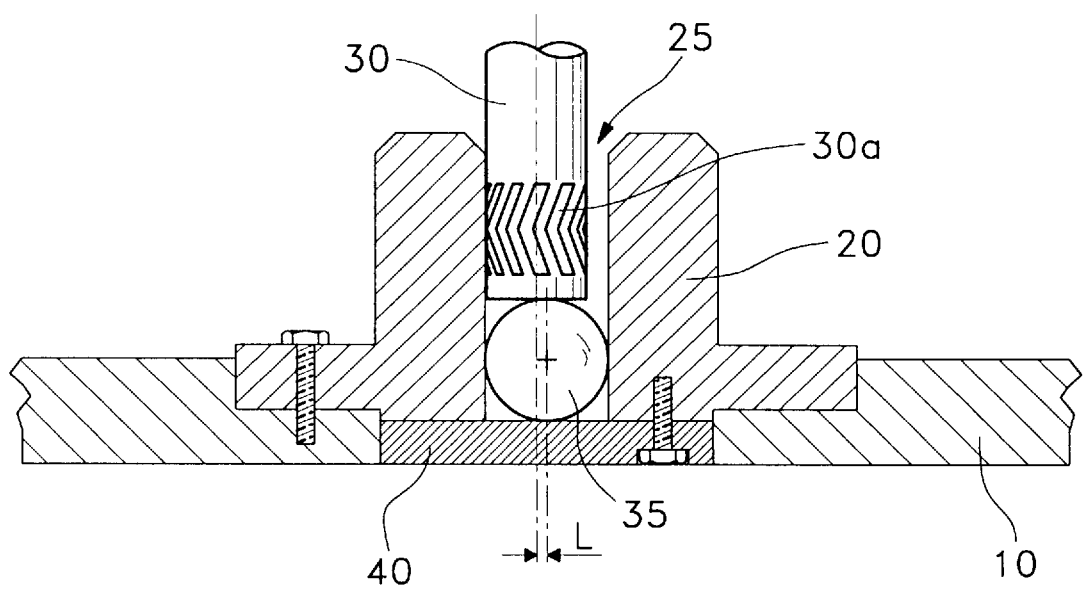
FIG. 1 is a partial sectional view illustrating a conventional both-end supporting pivot thrust bearing apparatus.
Figure 2:
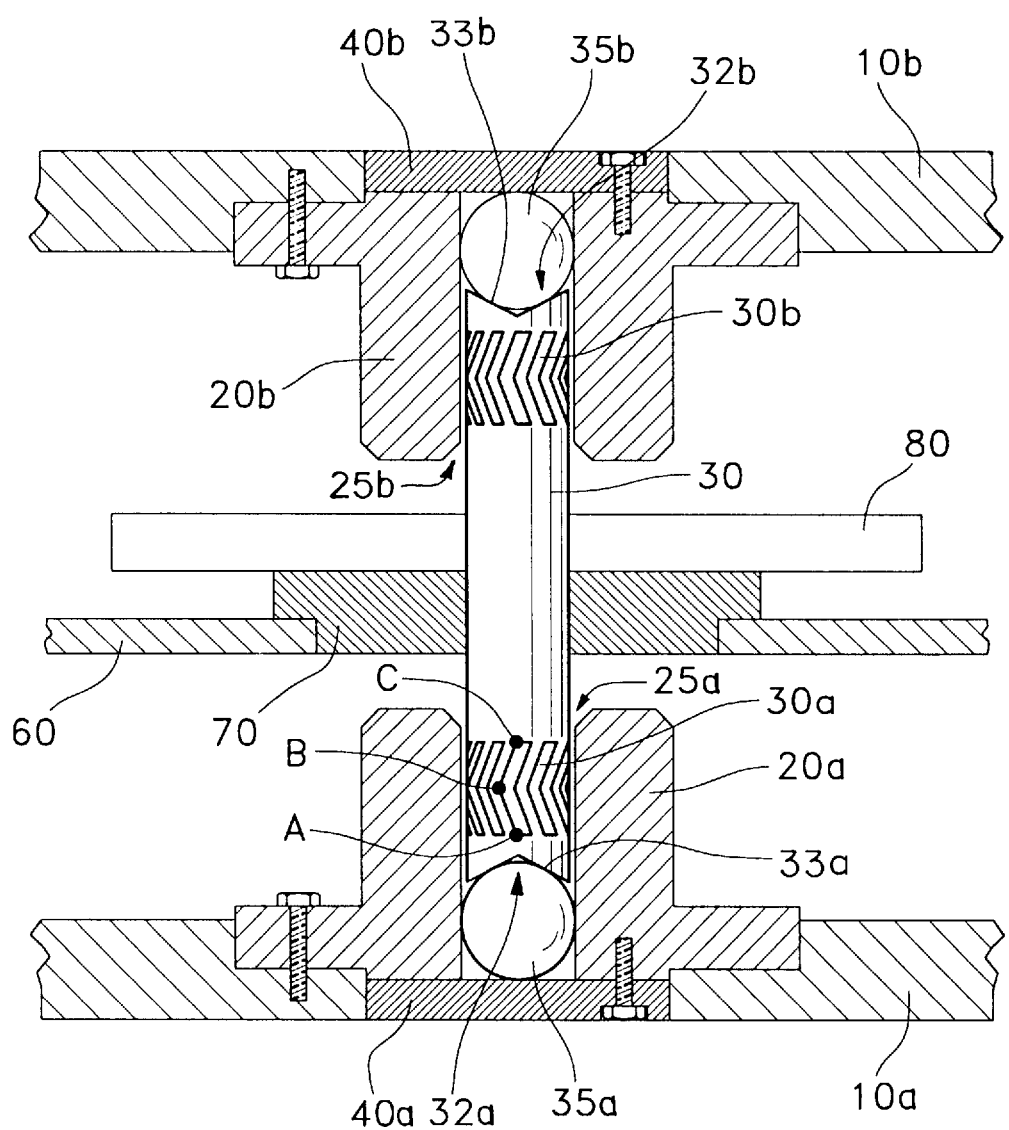
FIG. 2 is a sectional view illustrating a both-end supporting pivot thrust bearing apparatus according to the present invention, which is applied to a polygon mirror driving gear of a laser printer.

Referring to FIG. 2, a pair of sleeves 20a, 20b having a through hole 25a, 25b is fitted into one end of a pair of lower and upper bearing brackets 10a, 10b, respectively. The sleeves are fastened with the lower and upper bearing brackets 10a, 10b by a clamp screw or the like. A pair of thrust supports 40a, 40b are fitted into the other end of the lower and upper bearing brackets 10a, 10b and fastened with the sleeves 20a, 20b by a screw. A rotary shaft 30 is inserted into the through holes 25a, 25b of the sleeves 20a, 20b. A plurality of herring bone shaped kinetic pressure generating grooves 30a, 30b are formed on an external side of the rotary shaft 30 which is inserted into the through holes 25a, 25b of the sleeves, so that the sleeves 20a, 20b and the rotary shaft 30 can rotate without contacting with each other. The kinetic pressure generating grooves 30a, 30b are formed at a predetermined interval and have an angle β of about 30°. A depth and an area of the kinetic pressure generating groove 30a, 30b are determined by the tare and load of the rotary shaft 30.

Furthermore, a polygon mirror 80 is push-fitted into the rotary shaft 30, which reflects laser beams upon a photosensitive drum of a laser printer. A plate 60 (partially shown) is fixed to the rotary shaft 30 by a hub 70.

In the first embodiment of the present invention, a pair of cone shaped steel ball grooves 32a, 32b are formed at both ends of the rotary shaft 30 which is inserted into the through holes 25a, 25b of the sleeves 20a, 20b. An apex of the cone shaped steel ball grooves 32a, 32b is disposed on the center shaft of the rotary shaft 30. A pair of steel balls 35a, 35b are inserted between the cone shaped steel ball grooves 32a, 32b and the thrust supports 40a, 40b. The steel balls 35a, 35b are in contact with an inner sidewalls 33a, 33b of the cone shaped steel ball grooves 32a, 32b, respectively, by line contact when the rotary shaft 30 stops its rotation. Such line contact prevents the rotary shaft 30 from being moved in left and right directions.

The operation of the dual supporting pivot thrust bearing apparatus according to the embodiment of the present invention will be described with reference to a polygon mirror driving scanning motor of a laser printer.

The sleeve 20b is fixably inserted into one end of the upper bearing bracket 10b. The thrust support 40b is fixably inserted into the other end of the upper bearing bracket 10b. In the same manner, the sleeve 20a and the thrust support 40a are fixably inserted into the lower bearing bracket 10a. The steel balls 35a, 35b are inserted into the sleeves 20a, 20b, respectively. The rotary shaft 30 having the cone shaped steel ball grooves 32a, 32b are inserted into both ends of the sleeves 20a, 20b. Before the rotary shaft 30 is inserted into the both ends of the sleeve 20, the hub 70 is press-fitted onto the rotary shaft 30, which is combined with the polygon mirror 80 and the plate 60. Finally, the lower bearing bracket 10a and the upper bearing bracket 10b are fixably combined with each other to complete a scanning motor.

As aforementioned, if the power source is applied after assembly of the scanning motor, the rotary shaft 30 and the polygon mirror 80 which is fixed to the rotary shaft 30 start to rotate by rotation of the plate 60. At this time, a fluid flows into a B portion of the kinetic pressure generating groove through A and C portions thereof so that a predetermined fluid pressure occurs. Thus, the rotary shaft 30 rotates without contacting the sleeves 20a, 20b by the fluid pressure.

In the present invention, when the rotary shaft 30 starts to rotate, the center axis of the steel balls 35a, 35b are coincident with that of the rotary shaft 30. That is, the steel balls 35a, 35b are into two parts by the apex of the cone shaped steel ball grooves 32a, 32b formed at both ends of the rotary shaft 30 so that the apex of the steel ball grooves 32a, 32b are coincident with the center axis of the steel balls 35a, 35b. At this time, since the apex of the steel ball grooves 32a, 32b are disposed on the center shaft of the rotary shaft 30, the center axis of the steel balls 35a, 35b are always coincident with the center shaft of the rotary shaft 30. Thus, the rotary shaft rotates in such a manner that the center of the rotary shaft is not eccentric against the center of the steel ball. As a result, the rotary shaft can stably rotate.

Furthermore, when the rotary shaft stops its rotation, rotative speed of the rotary shaft is almost "0" so that the center of the rotary shaft is not eccentric against the center of the steel ball by the steel ball groove. As a result, the rotary shaft can stably stop its rotation without frictional resistance with the inner sidewall of the through hole of the sleeve.

As aforementioned, the dual supporting pivot thrust bearing apparatus according to the present invention has the following advantages.

The steel ball groove is formed at the both ends of the rotary shaft and the steel ball is fixably inserted into the steel ball groove so as to avoid eccentricity between the center shaft of the steel ball and the center shaft of the rotary shaft. This improves rotative stabilization of the rotary shaft.

Figure 3A:
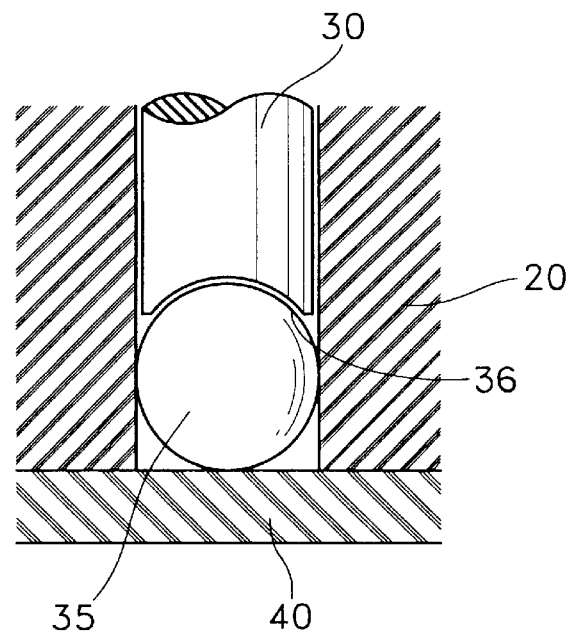
FIG. 3 shows modification examples of a steel ball groove according to the present invention.
Figure 3B:
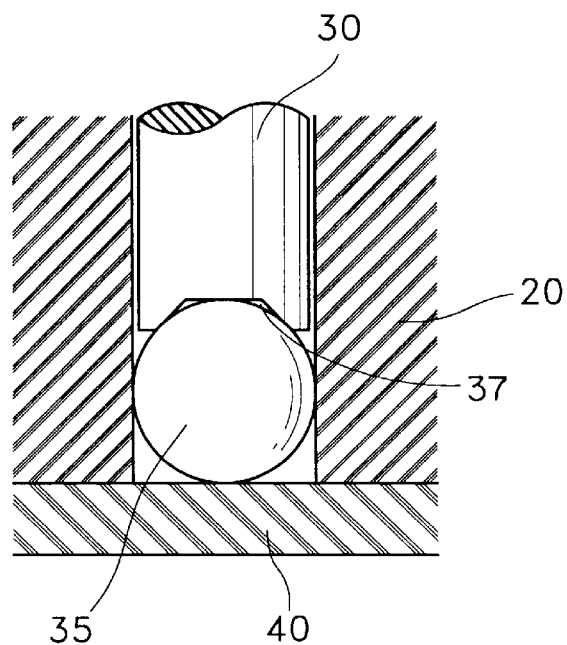

It will be apparent to those skilled in the art that various modifications and variations can be made in the dual supporting pivot thrust bearing apparatus according to the present invention without departing from the spirit or scope of the invention. For example, a hemispheric shaped ball groove 36 having a predetermined curvature may be formed as illustrated in FIG. 3A. In addition, a trapezoid shaped ball groove 37 may be formed so as to be contacted with the ball by line contact as shown in FIG. 3B. Thus, it is intended that the present invention cover the modifications and variations of the invention provided they come within the scope of the appended claims and their equivalents.

What is claimed is:

1. A supporting pivot thrust bearing apparatus comprising:
    a pair of sleeves mounted into a pair of bearing brackets, having through holes therein;
    a rotary shaft inserted into the through holes of said pair of sleeves, having two ends and a kinetic pressure generating groove on an external side which faces an internal side of the respective through hole;
    a pair of thrust supports mounted into said pair of bearing brackets;
    a steel ball inserted between both ends of said rotary shaft and said pair of thrust supports; and
    a position fixing means formed at both ends of said rotary shaft and in contact with said steel ball to prevent lateral motion of said steel ball.

2. The supporting pivot thrust bearing apparatus as claimed in claim 1, wherein said position fixing means includes a groove having a center shaft which is coincident with a center shaft of said rotary shaft.

3. The supporting pivot thrust bearing apparatus as claimed in claim 2, wherein said groove has a triangular shaped section.

4. The supporting pivot thrust bearing apparatus as claimed in claim 3, wherein an apex of said triangular shaped groove is disposed on the center shaft of said rotary shaft and said steel ball is in contact with an inner sidewall of said triangular shaped groove.

5. The supporting pivot thrust bearing apparatus as claimed in claim 2, wherein said groove has a circular arc shaped section.

6. The supporting pivot thrust bearing apparatus as claimed in claim 5, wherein said circular arc shaped groove has a curvature larger or equal to that of said steel ball.

7. The supporting pivot thrust bearing apparatus as claimed in claim 2, wherein said groove has a trapezoid shaped section.

8. The supporting pivot thrust bearing apparatus as claimed in claim 7, wherein said steel ball is in contact with an inner sidewall of said trapezoid shaped groove.

* * * * *